March 18, 1952 L. Y. LACY 2,589,711

OFF-CHANNEL SQUELCH CIRCUIT FOR RADIO RECEIVERS

Filed May 5, 1948

INVENTOR
L. Y. LACY
BY G. H. Stevenson
ATTORNEY

Patented Mar. 18, 1952

2,589,711

UNITED STATES PATENT OFFICE 2,589,711

OFF-CHANNEL SQUELCH CIRCUIT FOR RADIO RECEIVERS

Lester Y. Lacy, Madison, N. J., assignor to Bell Telephone Laboratories, Incorporated, New York, N. Y., a corporation of New York Application May 5, 1948, Serial No. 25,188

4 Claims. (Cl. 250—20)

Figures 1, 2:
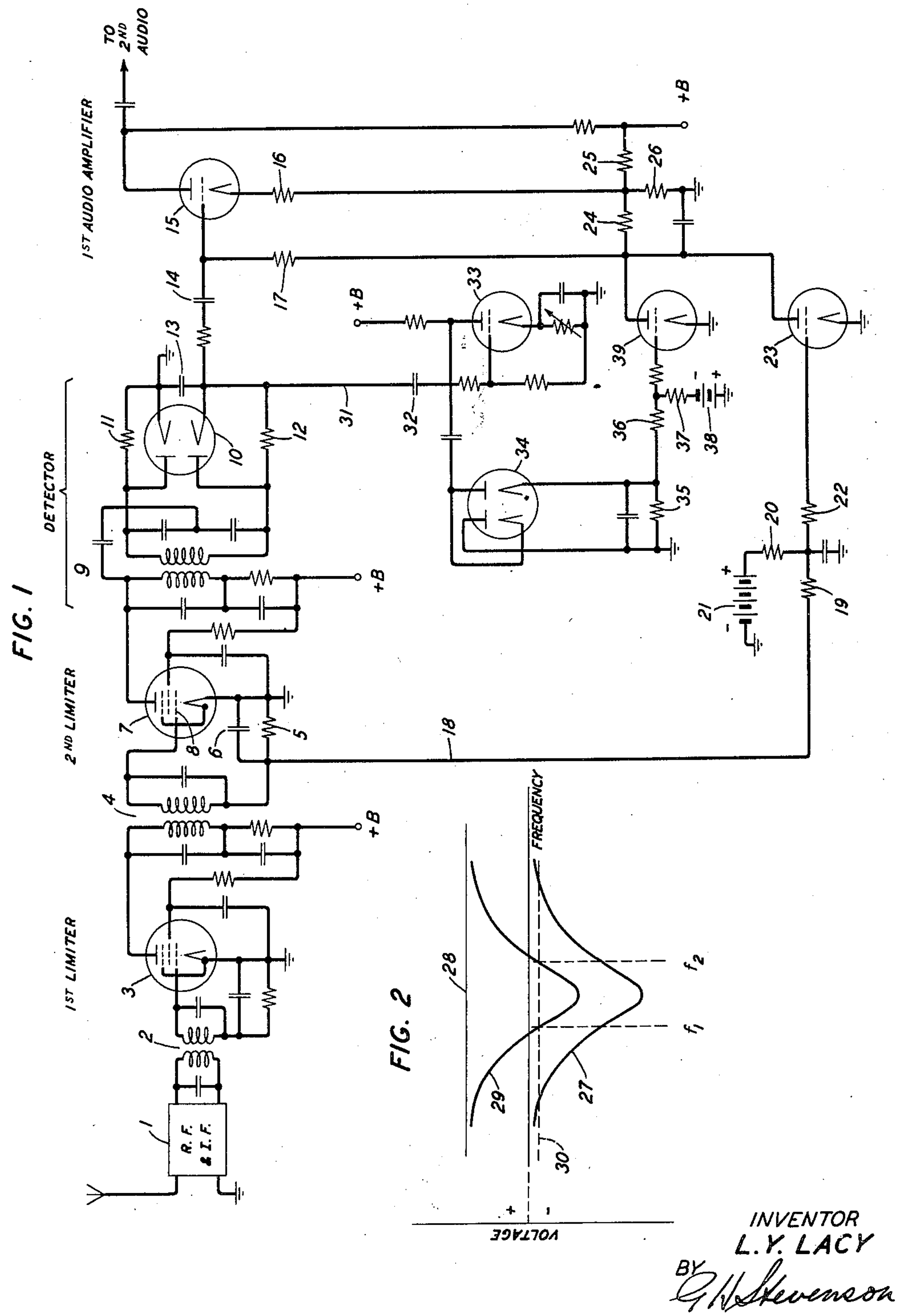

This invention relates to automatic muting or squelch circuits for radio receivers and particularly to circuits of this kind wherein the action is determined by the frequency and amplitude of the received carrier.

The principal object of the invention is to prevent false operation of the squelch circuit by carrier waves of frequencies different from that to which the receiver is tuned but closely spaced therefrom, as in an adjacent communication channel.

Another object is to provide a positive control of the squelch circuit by off-tune carrier waves which operate to hold the squelch circuit closed.

By closing the squelch is meant muting the receiver, or disabling the receiver output circuit, and by opening the squelch is meant removing the muting action and so making the receiver operative in the reproduction of signals.

The invention is particularly adapted to mobile radio-telephone and other systems where the assigned frequency channels are closely spaced and where a receiver operating in a given channel is subject to interference by carrier waves of a neighboring channel frequency. One method of preventing such interference would be to make the signal circuits of the receiver sufficiently selective to exclude the unwanted frequencies. This, however, is likely to entail the use of complex and costly selective circuits and for many purposes is not economically practicable. The desired result is obtained by this invention with the use of very simple and inexpensive circuits.

One type of squelch circuit commonly used effects the muting of the receiver in the absence of a carrier and the automatic opening of the squelch when a carrier of the desired frequency is being received. The principal purpose of a squelch circuit of this character is to avoid the reception of the noise which prevails in the standby condition, when no carrier is being received, and which may be objectionable to the listener, or may produce voltages which falsely operate signaling devices in the output circuit of the receiver. As examples of squelch circuits intended for this purpose may be mentioned Noble 2,343,115, February 29, 1944, and Peterson 2,400,948, May 28, 1946. While squelch circuits of this kind may guard the receiver against noise, they do not act as a guard against off-channel carriers. This is because of the character of the control voltages used for the automatic operation of the squelch, these depending upon noise voltages in the receiver, which may be affected by off-tune as well as by in-tune carriers. A feature of the present invention is that it relies upon control voltages that are independent of noise in the receiver.

In accordance with this invention a muting or squelching device, such as a vacuum tube, is controlled by the resultant of two opposing voltages. One of these is a fixed voltage of one polarity which tends to hold the muting means operative; the other is a voltage of the opposite polarity derived by rectifying the carrier voltage at a selected point in the receiver where the voltage varies with the frequency of the carrier but not appreciably with its magnitude, this voltage tending to hold the muting means inoperative. Specifically, the second voltage is the rectified output of a resonant coupling circuit tuned to the mid-band frequency of the receiver and connected to the output terminals of an amplitude limiter. The relative magnitudes of the opposing voltages may be adjusted so that for carrier frequencies outside the receiver band the voltage of one polarity is greater and holds the squelch closed, while for carrier frequencies within the receiver band the voltage of the opposite polarity is greater and holds the squelch open.

The invention is applicable to either a frequency modulation receiver, in which case the limiter referred to is the limiter included in this type of receiver; or to an amplitude modulation receiver, in which case a limiter may be connected in a branch circuit at the output terminals of the intermediate frequency amplifier, for the purposes of the invention.

In connection with the following detailed description, reference is made to the accompanying drawings, of which:

Fig. 1 illustrates schematically an embodiment of the invention as applied to a frequency modulation type of receiver; and Fig. 2 is a graphical representation of the control voltages used in the invention.

In Fig. 1 there is shown a frequency modulation receiver of conventional type which is provided with a common form of noise-operated squelch and also an off-channel squelch in accordance with my invention. The signal circuits of the receiver comprise a high frequency and intermediate frequency portion 1, tuned intermediate frequency transformer 2, first amplitude limiter 3, tuned coupling transformer 4, second amplitude limiter 7, a differential frequency detector comprising frequency selective network 9 and double rectifier tube 10, and first audio amplifier 15. Rectified signal voltages are developed across load resistors 11 and 12 of the two rectifiers and the differential voltage appears across the terminals of condenser 13, one side of which is grounded. This voltage is transmitted through blocking condenser 14 to the grid of tube 15, wherein it is amplified and passed to an output circuit as indicated.

The grid circuit of tube 15 includes biasing means controlled by the squelch devices as hereinafter described, whereby the output circuit is made operative upon the reception of the proper carrier wave.

The squelch circuit of the invention comprises resistor 5 and condenser 6 in the input circuit of limiter tube 7, and the circuit branching therefrom via conductor 18 and including resistors 19, 20 and 22 and vacuum tube 23, together with the output circuit thereof. The voltage across the secondary terminals of transformer 4 is impressed upon the grid 8 of tube 7 and is rectified in the grid-cathode space path, thereby producing a direct current potential difference across resistor 5 and applying a negative voltage to conductor 18. This voltage is substantially independent of amplitude variations in the received carrier wave because of the action of limiter 3, but varies with the frequency in accordance with the selective characteristic of transformer 4. Before being impressed upon the grid of tube 23, the negative rectified voltage is combined with a fixed positive voltage which is derived from a positive source by means of potential dividing resistors 5, 19 and 20. The latter source is indicated as a battery 21, but ordinarily this would be the common source of plate current for the receiver vacuum tubes. Resistor 22 protects the grid of tube 23 against large currents in the event of a short circuit within the tube. Plate current for tube 23 is obtained from the common plate current source, the positive terminal of which is indicated by +B throughout the drawing, through potential dividing resistors 25 and 26 and series resistor 24. The grid of the controlled tube 15 is connected to the plate of tube 23 through high resistance resistor 17. The grid bias of tube 15 is thus determined by the potential of the plate of tube 23, which depends upon the current flowing through resistor 24, this in turn being controlled by the potential on the grid of tube 23.

For a clearer understanding of the operation of this portion of the circuit reference is made to Fig. 2. Here curve 27 represents qualitatively the variation with the carrier wave frequency of the negative voltage to ground across resistor 5 due to the rectified current flowing between the cathode and grid 8 of limiter 7. This voltage is proportional to the alternating voltage across the secondary terminals of transformer 4. When a carrier is being received it is due almost entirely to the carrier, since noise components are practically eliminated by the action of the first limiter tube 3. On account of the resonant response of the coupling transformer 4 this voltage will vary with the frequency of the received carrier in a manner such as shown by curve 27 and, so long as the received carrier is of sufficient strength to saturate limiter 3, it will not vary appreciably with the magnitude of the receiver input. The horizontal line 28 represents the fixed positive bias voltage supplied by the direct current source, and the two voltages 27 and 28 are shown algebraically combined as curve 29. The cut-off voltage for tube 23 is represented by the horizontal line 30. The two frequencies at which lines 29 and 30 intersect are designated $f_1$ and $f_2$. The voltage represented by curve 29 is the resultant voltage which is applied to the grid of tube 23. For carrier frequencies outside the band from $f_1$ to $f_2$ the resultant grid voltage is more positive than the cut-off value and tube 23 will therefore conduct. When the tube conducts, the voltage drop at the plate due to current flowing through resistor 24 causes the grid voltage of audio tube 15 to fall below cut-off, thus muting the receiver. However, for carrier frequencies within the band from $f_1$ to $f_2$ the resultant voltage represented by curve 29 is more negative than the cut-off value and holds tube 23 non-conducting. For this condition, therefore, audio tube 15 continues in its operating state. The magnitudes of the fixed biasing voltage and the rectified voltage drop across resistor 5 may be so proportioned that the frequency interval from $f_1$ to $f_2$ is approximately equal to the receiver's assigned channel width.

The noise-operated squelch shown in Fig. 1 comprises the circuit branching from condenser 13 via conductor 31 and including condenser 32, vacuum tube 33, rectifier 34, resistors 35, 36 and 37, battery 38, and vacuum tube 39, which has an output circuit in common with tube 23 and performs a similar function. Noise voltages appearing across condenser 13, which may be large in the absence of a carrier, are selected by condenser 32 (or other high-pass filtering means), amplified by tube 33, and rectified by tube 34 so as to produce a positive voltage across resistor 35, one end of which is grounded. This voltage is combined with a fixed negative voltage from battery 38 and potential dividing resistors 35, 36 and 37, and the resultant applied to the grid of tube 39. When a carrier wave is received the rectified noise voltage across resistor 35 is small because of the well known action of the amplitude limiters, and for this condition the resistances 35, 36 and 27 are adjusted so that the resultant potential on the grid is sufficiently negative to hold tube 39 at cut-off, permitting audio tube 15 to remain conducting. Then in the absence of a carrier the rectified noise voltage which is now large, causes tube 39 to conduct and tube 15 to be cut off. The addition of a noise operated squelch supplements the action of the off-channel squelch by preventing the enabling of the receiver output circuit by noise currents in the absence of any carrier. These currents under certain circumstances may be strong enough to saturate the amplitude limiters and provide a rectified voltage sufficient to bias tube 23 beyond cut-off, thereby opening the squelch. When the separate noise squelch is provided as shown, this is prevented by the flow of current in tube 39 which is rendered conductive by the rectified noise currents.

What is claimed is:

1. In a modulated-carrier signal receiver of the superheterodyne type including a current amplitude limiter and a muting device for silencing the receiver for received off-tune carrier waves, said muting device comprising a grid-controlled vacuum tube having a grid cut-off voltage characteristic and being responsive to an applied control voltage of one polarity with respect to said cut-off voltage to hold same effective and the opposite polarity to hold it ineffective, means for producing a control voltage for said muting device having one polarity with respect to said cut-off voltage for received off-tune waves and the opposite polarity for received in-tune waves, said means comprising means for selecting from the received carrier waves at the output terminals of said limiter oscillations in a band centered about the frequency to which the receiver is tuned, a rectifier for rectifying the selected oscillations to produce a direct-current control voltage, a source of fixed direct-current voltage of opposite polarity, means for combining said rectified voltage and a portion of the voltage from said source so that the resultant has one polarity with respect to said cut-off voltage for frequencies outside the frequency band of the receiver and the opposite polarity for frequencies within the receiver band, and means for applying the said resultant voltage to the muting device in such polarity with respect to said cut-off voltage that for received off-tune carrier waves it holds the device effective and for received in-tune waves it holds the same ineffective.

2. In combination, a modulated-carrier signal receiver of the superheterodyne type, a muted device for silencing said receiver for received off-tune carrier waves, said muting device comprising a grid-controlled vacuum tube having a grid cut-off voltage characteristic and being responsive to an applied control voltage of positive polarity with respect to said cut-off voltage to hold same effective and negative polarity to hold it ineffective, means for producing a control voltage for said muting device having a positive polarity with with respect to said cut-off voltage for received off-tune waves and a negative polarity for received in-tune waves, said means comprising a limiter-amplifier coupled to the intermediate-frequency channel of said receiver, means for selecting at the output terminals of said limiter-amplifier oscillations in a band centered about the frequency to which the receiver is tuned, a rectifier for rectifying the selected oscillations to produce a negative control voltage, a source of fixed positive control voltage, means for combining said rectified voltage and a portion of the voltage from said source having a magnitude greater than the difference between the rectified voltage produced by any received carrier wave of a frequency outside the band of the said selective circuit and the said cut-off voltage but less than the difference between the rectified voltage produced by any received carrier wave of a frequency within said band and said cut-off voltage, and a circuit for applying the resultant voltage to said muting device to operate the same.

3. In a frequency modulation receiver of the type including a first audio amplifier, a frequency modulation detector, a first and a second limiter, said second limiter being a grid-controlled space discharge device wherein limiting of the ouput occurs by virtue of conduction in the grid-cathode circuit, a circuit selectively responsive to waves in the frequency band to which the receiver is tuned coupling the output terminals of the first limiter to the grid-cathode circuit of the second limiter, and a muting device for holding the output circuit inoperative for received off-tune carrier waves and operative for received in-tune waves, said muting device comprising a grid-controlled vacuum tube having a grid cut-off voltage characteristic and being responsive to an applied voltage positive with respect to said cut-off voltage to hold same effective and negative thereto to hold it ineffective, means for producing a control voltage for said muting device having a positive polarity for received off-tune waves and a negative polarity for received in-tune waves, said means comprising a resistor and a capacitor in the grid-cathode circuit of the second limiter for developing a negative control voltage, a source of fixed positive control voltage, a circuit for selecting a portion of the voltage from said source having a magnitude greater than the difference between the rectified voltage produced by any received carrier wave of a frequency outside the frequency band of the said selective circuit and the said cut-off voltage but less than the difference between that produced by any received carrier within said band and said cut-off voltage, a circuit for combining said negative control voltage with said positive portion, and a circuit for applying the resultant voltage to said muting device to operate the same.

4. In combination, a modulated-carrier signal receiver of the superheterodyne type, a muting device for silencing said receiver comprising an electron discharge tube having an anode, a cathode and a grid and being effective when a critical value of anode current flows to disable the receiver output, means for holding said muting device effective by waves of a frequency outside an assigned band centered about the frequency to which the receiver is tuned and ineffective for waves within said band, said means comprising a limiter-amplifier coupled to a point in said receiver, a tuned circuit resonant to the center frequency of said band coupled to the output terminals of said limiter-amplifier, a rectifier for rectifying the oscillations in said tuned circuit to produce a negative control voltage, a source of positive biasing voltage connected to said grid having a magnitude substantially equal to the rectified voltage produced by waves of a frequency corresponding to one of the limits of said band, and a circuit including said biasing source for applying said negative rectified voltage to said grid.

LESTER Y. LACY.

REFERENCES CITED

The following references are of record in the file of this patent:

UNITED STATES PATENTS

| Number | Name | Date |
|---|---|---|
| 2,096,874 | Beers | Oct. 26, 1937 |
| 2,197,516 | Case | Apr. 16, 1940 |
| 2,261,643 | Brown | Nov. 4, 1941 |
| 2,370,216 | Worcester, Jr. | Feb. 27, 1945 |
| 2,372,934 | Campbell | Apr. 3, 1945 |
| 2,447,564 | Carnahan | Aug. 24, 1948 |
| 2,479,305 | Brown | Aug. 16, 1949 |